Figures 1, 2:
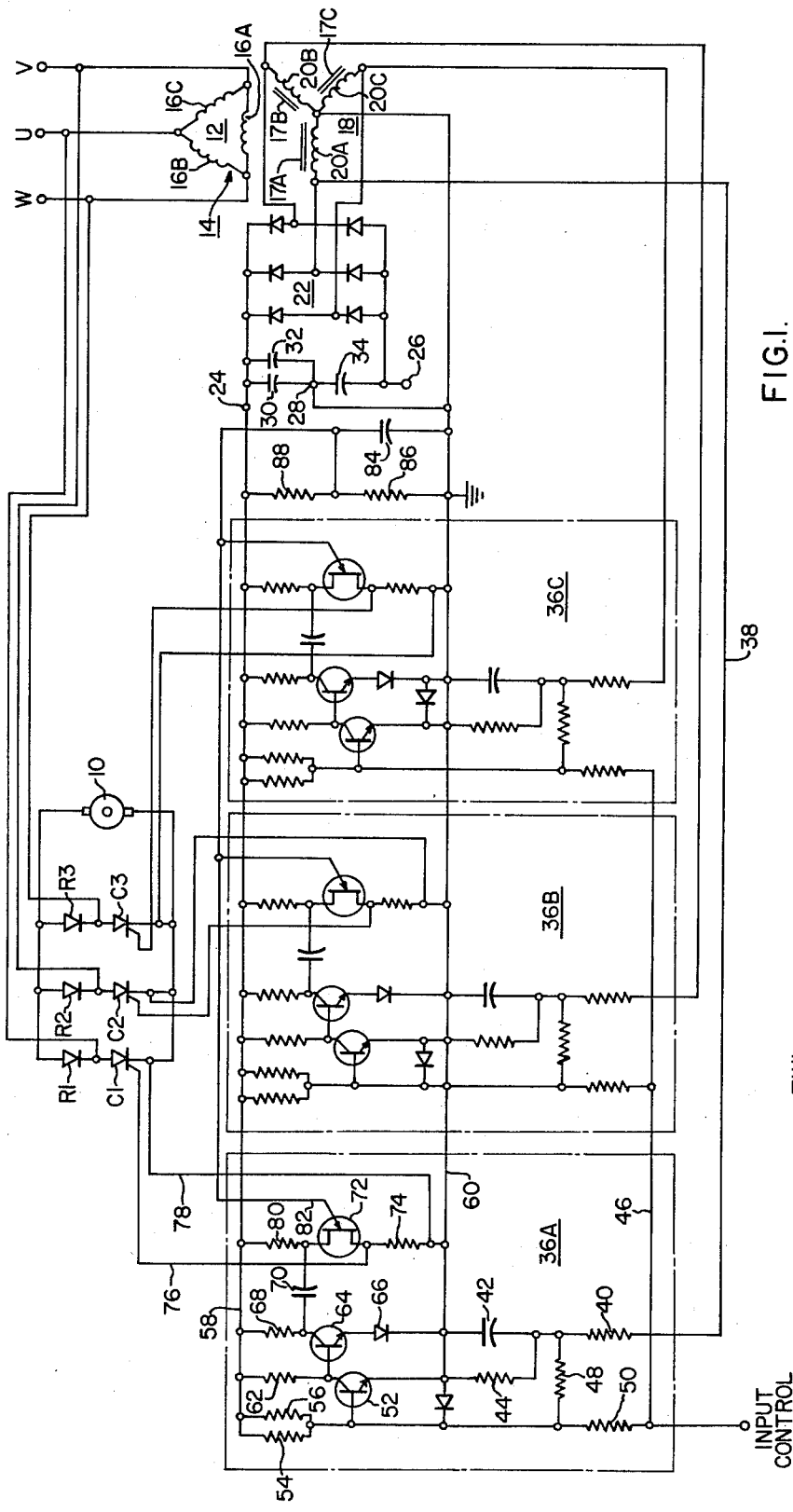

United States Patent
Danz et al.

[11] 3,796,941
[45] Mar. 12, 1974

[54] FIRING CIRCUITS FOR THREE-PHASE RECTIFIER EMPLOYING CONTROLLED RECTIFIER ELEMENTS

[75] Inventors: George E. Danz, Williamsville; Alan F. Wilkinson, Jr., Clarence Center, both of N.Y.

[73] Assignee: Westinghouse Electric Corporation, Pittsburgh, Pa.

[22] Filed: Nov. 1, 1971

[21] Appl. No.: 194,434

Related U.S. Application Data

[63] Continuation of Ser. No. 87,754, Nov. 9, 1970, abandoned.

[52] U.S. Cl. .................................... 321/5, 321/47
[51] Int. Cl. ............................................. H02m 7/00
[58] Field of Search ........ 321/5, 18, 47; 307/252 N, 307/252 P, 252 Q, 301; 320/DIG. 2

[56] References Cited
UNITED STATES PATENTS

| | | | |
|---|---|---|---|
| 3,114,098 | 12/1963 | Rallo et al. ........................ | 321/47 X |
| 3,281,645 | 10/1966 | Spink .................................. | 321/47 |
| 3,517,296 | 6/1970 | Kuhn .................................. | 321/47 X |
| 3,564,388 | 2/1971 | Nolf .................................... | 321/18 |
| 2,937,289 | 5/1960 | Aldrich et al. .................... | 307/301 |
| 3,660,691 | 5/1972 | Glawleschkoff et al. .......... | 307/301 |

*Primary Examiner*—William M. Shoop, Jr.
*Attorney, Agent, or Firm*—C. M. Lorin

[57] ABSTRACT

A low-cost linear gate pulse generator and power supply designed for use in gating controlled rectifiers and, in particular, controlled rectifiers in a three-phase bridge arrangement. The power supply portion supplies power to both the gating circuits and auxiliary control circuits and necessitates the use of only three low-cost single-phase transformers unlike other circuits which historically use separate transformers for control power, timing waves and pulsing.

16 Claims, 2 Drawing Figures

FIRING CIRCUITS FOR THREE-PHASE RECTIFIER EMPLOYING CONTROLLED RECTIFIER ELEMENTS

This is a continuation, of application Ser. No. 087,754 filed Nov. 9, 1970, and now abandoned.

BACKGROUND OF THE INVENTION

As is known, a controlled three-phase bridge rectifier employs at least three controlled rectifiers, such as thyristors, which are fired in accordance with phase commutation techniques to vary the power supplied to a load, such as a motor armature. The arrangement is such that at a point following the start of every half cycle of each of the three phases, a controlled rectifier is fired to deliver the remainder of the voltage waveform to a load.

Firing pulses are applied to the rectifiers by firing circuits which can deliver output pulses, formed by discharge of a capacitor, at variable phase angles with respect to the zero crossings of the applied three phases. In one type of firing circuit, cosine waves are generated, each of which leads an associated phase of the three-phase source by 90°. The circuit is such that whenever the cosine wave intersects a voltage reference level as it is negative-going, a pulse will be produced which fires an associated thyristor in the bridge rectifier. By superimposing a direct current control signal on the cosine wave, it can be made to move upwardly or downwardly with respect to the voltage reference level, thereby varying the phase angle of the firing pulse with respect to an applied power waveform.

A firing circuit of this type requires a source of relatively low voltage reference waveforms from which the cosine waves can be generated, as well as a power supply for the firing circuit and auxiliary equipment. In the past, this usually required a three-phase transformer between the three-phase source and firing circuits for generation of low voltage reference waveforms, together with a second transformer and rectifier for the power supply. Alternatively, a three-phase transformer with multiple secondary windings was used, one set of windings for the timing waveforms and the other for generating a power supply. In either case, the cost of the transformer or transformers is relatively large. Furthermore, a regulated power supply was required together with separate pulse storage capacitors for each of these firing circuits.

SUMMARY OF THE INVENTION

In accordance with the present invention, a firing circuit for a controlled three-phase bridge rectifier is provided which is simpler and more economical in construction than prior art devices of this type by virtue of the fact that: (1) the circuit requires only three simple low-cost, single-phase transformers for supplying both timing wave-forms and a source of power for the circuit, (2) only a single pulse storage generator is used for all phases rather than the three required by prior art circuits, (3) the system uses an unregulated power supply for gating and thereby is self-compensating for line voltage variations and, (4) it utilizes in the firing circuits unijunction transistors in a manner such that the stand-off ratio variations of the unijunction transistors do not produce uneven gating causing unequal load sharing in the controlled rectifiers.

In accordance with one specific embodiment of the invention shown herein, three firing circuits are employed, one for each controlled rectifier in a three-phase bridge rectifier arrangement. Each firing circuit includes a series circuit consisting of an impedance and a switch device, preferably a unijunction transistor, which will deliver a firing pulse to an associated one of the controlled rectifiers when the unijunction transistor is fired. A single capacitor is connected across all of the series circuits in parallel for forming the firing pulses when the unijunction transistors are fired. The pulse generators each include apparatus for generating a number of timing waveforms corresponding to the number of firing pulses, which apparatus comprises a single transformer, preferably formed from three single-phase transformers. The three transformers have primary windings connected to the three phases of a three-phase supply and secondary windings connected to the pulse generators. These same secondary windings are connected to a rectifier for developing a power supply for the pulse generators.

The aforesaid single capacitor for forming the firing pulses is charged from the same power supply as is used to supply power to the unijunction transistors. As a result, the ratio of the interbase voltage to the emitter voltage of the unijunction transistors remains constant even though the power supply voltage may vary. Consequently, an unregulated power supply can be used.

The above and other objects and features of the invention will become apparent from the following detailed description taken in connection with the accompanying drawings which form a part of this specification, and in which:

FIG. 1 is a schematic circuit diagram of the pulse generator of the present invention, showing its connection to a three-phase controlled bridge rectifier arrangement; and FIG. 2 comprises waveforms illustrating the operation of the circuit of FIG. 1.

With reference now to the drawings, and particularly to FIG. 1, the three phases of a three-phase alternating current supply, not shown, are connected to input terminals U, V and W. Phase rotation of the three phases is from V to U to W. These terminals, in turn, are connected to a controlled three-phase bridge rectifier arrangement comprising three parallel current paths each including a conventional rectifier R1, R2 or R3 in series with a thyristor or controlled rectifier C1, C2 or C3. The junction of rectifiers R1 and C1 is connected to input terminal U; the junction of rectifiers R2 and C2 is connected to input terminal V; and the junction of rectifiers R3 and C3 is connected to input terminal W. The three parallel combinations of rectifiers are, in turn, connected across a load which is schematically illustrated in FIG. 1 as a motor armature 10.

Firing pulses are applied between the gate electrodes and cathodes of the controlled rectifiers C1-C3 in timed sequence. With the arrangement shown, a direct current voltage will appear across the armature 10, the average value of which is dependent upon the point following initiation of the positive halves of the three applied phases that the controlled rectifiers C1-C3 are fired. The manner of operation of the bridge rectifier will hereinafter be described in greater detail.

Also connected to the three input terminals U, V and W is the primary winding means, generally indicated by the reference numeral 12, of a transformer 14. The primary winding means 12 is formed from the primary windings 16A, 16B and 16C of three single-phase transformers, connected in a delta arrangement. Each single-phase transformer is provided with a separate core 17A, 17B or 17C. The secondary winding means 18 of the transformer 14 is formed from the secondary windings 20A, 20B and 20C of the aforesaid single-phase transformers connected in a Y-configuration. These secondary windings are connected to a three-phase bridge rectifier 22 which produces a voltage at terminal 24 of +24 volts and a voltage at terminal 26 of −24 volts. The terminal 28 connected to the center of the Y-configuration secondary winding means 18 is at ground potential and is connected to terminal 24 through smoothing capacitors 30 and 32 and to terminal 26 through smoothing capacitor 34.

The secondary windings 20A–20C, across which wave-forms appear spaced 120° apart, are applied to three identical firing circuits 36A, 36B and 36C which, in turn, produce firing pulses for controlled rectifiers C1, C2 and C3, respectively. Since all three firing circuits 36A–36C are identical, only the firing circuit 36A will be described in detail, it being understood that the remaining two have identical elements.

The outer end of the secondary winding 20A on transformer 14 is connected through lead 38 to one end of resistor 40; while the other end of resistor 40 is connected through the parallel combination of capacitor 42 and resistor 44 to ground. This RC network of elements 42 and 44 acts to shift the reference wave by 30°, which filters notches from the alternating current line voltage and makes the gate insensitive to line noise such as that caused by other thyristor drives.

The phase shifted reference wave is then summed with a reference control signal on lead 46 through resistors 48 and 50 respectively and applied to the base of transistor 52. The base of transistor 52 is connected, as shown, through resistors 54 and 56 to a common positive supply bus 58 for all firing circuits 36A–36C. Bus 58, in turn, is connected to the output terminal 24 of bridge rectifier 22. A common bus 60 connected to output terminal 28 of bridge rectifier 22 is at ground potential and acts as a point of common potential for all of the firing circuits 36A–36C.

The emitter of transistor 52 is connected to ground as shown; while its collector is connected through resistor 62 to the positive supply bus 58. The collector of transistor 52 is also connected to the base of a second transistor 64. The emitter of transistor 64 is connected to ground through diode 66 and its collector is connected to the positive supply bus 58 through resistor 68. This same collector of transistor 64 is connected through coupling capacitor 70 to the base-2 of a unijunction transistor 72. The base-1 of unijunction transistor 72 is connected through resistor 74 to ground, one end of resistor 74 being connected through lead 76 to the gate electrode of rectifier C1 in the controlled bridge rectifier and the other end of resistor 74 being connected through lead 78 to the cathode of controlled rectifier C1. Base-2 of the unijunction transistor 72 is also connected through resistor 80 to the positive supply bus 58.

The emitter 82 of unijunction transistor 72, as well as the emitters of the corresponding unijunction transistors in firing circuits 36B and 36C, is connected to one end of a charging capacitor 84, the other end of the capacitor 84 being grounded. Resistors 86 and 88, along with capacitor 84, form the capacitor charge circuit for all of the firing circuits, the arrangement being such that when any unijunction transistor 72 conducts, the capacitor 84 will discharge through its associated resistor 74 to produce a firing pulse for thyristor C1, C2 or C3.

The operation of the circuit can perhaps best be understood by reference to FIG. 2. Since thyristor C1 can be fired only during the time that the phase U-W is positive and since the reference wave from the secondary winding means is shifted in phase by 30° via elements 40, 42 and 44, it is necessary to use the voltage W-V as a reference wave to time pulses to be applied to thyristor C1. The voltage W-V appears across the secondary winding 20A and is applied through resistor 40 as explained above to the RC network consisting of elements 42 and 44. The reference wave U-W becomes a reference for pulse generator 36B; while the wave V-U is the reference for pulse generator 36C.

Ideally, a linear relationship is desired between the input to the firing circuit 36A, for example, and the output of the controlled rectifier. To generate this relationship, a cosine wave must first be generated. The gate pulse is then timed by shifting the level of the cosine wave with respect to ground. This is shown in FIG. 2 wherein the cosine wave TW1 leads the reference waveform U-W by 90° by virtue of the RC network of elements 42 and 44. Under the conditions assumed in FIG. 2, the control signal applied to lead 46 is zero, such that the cosine wave intersects ground potential at an angle of 180°. It is at this point that the transistor 52, for example, will be fired; however when the firing angle is 180°, the timing pulse occurs at the point where the reference waveform U-W crosses the zero axis and goes negative, such that the thyristor C1 cannot conduct and the output power is zero. In order to increase the power output of the bridge rectifier, it is necessary to shift the zero crossing of the timing wave TW1 in the negative-going direction to the left as shown in FIG. 2. This is achieved by superimposing a direct current control signal on lead 46 on the reference waveform TW1 via summing resistors 48 and 50.

As the direct current control voltage on lead 46 is superimposed on the cosine or timing wave TW1, it is forced to move downwardly as shown by the dotted curves in FIG. 2. Thus, when it is forced downwardly to the position of wave-form TW1′, the firing angle is decreased to 120°, whereupon the thyristor C1 will conduct at the 120° point and the volt-second area shown cross-hatched in FIG. 2 will be delivered by the thyristor C1 to the load 10. Again, if the control signal on lead 46 is increased, the timing cosine wave is shifted downwardly to, for example, the position of waveform TW1″ shown in FIG. 2, whereupon the waveform TW1″ crosses the zero axis at 90° and the thyristor C1 conducts for 90° whereas for TW1′ the thyristor C1 only conducts for 60°. This process can be continued until the firing angle is decreased as the power applied to the load 10 is increased.

When the base of transistor 52 goes negative, transistor 52 cuts off and its collector rises to the voltage level of positive bus 58. This saturates transistor 64 which now conducts; whereupon its collector voltage falls. This fall in voltage is then coupled through capacitor 70 to the base 2 of unijunction transistor 72. The time constant of capacitor 70, resistor 68 and resistor 80 causes a negative-going spike to occur at the base 2 of unijunction transistor 72 which causes it to fire. When the unijunction transistor 72 fires, capacitor 84 discharges through the emitter and base 2 of unijunction transistor 72 and through resistor 74. The resulting pulse across resistor 74 is then applied between the emitter and collector of the thyristor C1.

The operation of the remaining two firing circuits 36B and 36C is identical except, of course, that the output of firing circuit 36B is connected to the thyristor C2 while the output of firing circuit 36C is connected to the thyristor C3. Since none of the thyristors will be fired at the same time, the same capacitor 84 can be used to form firing pulses for all thyristors.

Both the rate of charging and the final value of the voltage on capacitor 84 is governed by resistors 86 and 88. The charging rate must not be so low that the voltage does not reach its final value before the next pulse is to be delivered. The fixed potential of the capacitor must not be too large or the unijunction transistors will fire needlessly or at improper times. If the potential across the capacitor is not high enough, the power used to gate the thyristor is substantially reduced. The voltage divider consisting of resistors 86 and 88 also serves to compensate for line voltage changes. In that event, the divider keeps the capacitor potential at a level which never exceeds the intrinsic stand-off ratio of the unijunction transistors and, hence a regulated power supply is not required.

Although the invention has been shown in connection with a certain specific embodiment, it will be readily apparent to those skilled in the art that various changes in form and arrangement of parts may be made to suit requirements without departing from the spirit and scope of the invention.

We claim:

1. A pulse generator for generating firing pulses for sequentially firing a plurality of controlled rectifiers in a three-phase rectifier arrangement, said generator comprising a plurality of firing circuits one for each of said controlled rectifiers, each of said firing circuits including a series circuit comprising an impedance and a switch device which will deliver a firing pulse to an associated one of said controlled rectifiers when the switch device is closed, a single capacitor being connected in parallel across all of said series circuits for forming said firing pulses when said switch devices close, means for closing said switch devices in sequence including apparatus for generating a number of timing waveforms corresponding to the number of firing circuits, said apparatus comprising transformer means having primary winding means connected to the three phases supplying said three-phase rectifier arrangement and secondary winding means connected to the respective ones of said firing circuits, and means in each of said firing circuits for shifting the phases of said timing waveforms with respect to the waveforms appearing across the secondary winding means of said transformer means.

2. The combination as in claim 1 wherein said three-phase rectifier arrangement is a three-phase bridge rectifier arrangement.

3. The pulse generator of claim 1 wherein said transformer means is formed from three single-phase transformers having their primary windings connected in a delta configuration and their secondary windings connected in a Y-configuration.

4. The pulse generator of claim 1 wherein each of said switch devices comprises a unijunction transistor.

5. The pulse generator of claim 4 wherein each of said controlled rectifiers comprises a thyristor, and said pulse generator further includes means connecting opposite ends of each of said impedances between the gate electrode and cathode of an associated one of said thyristors, said capacitor being connected across the emitter and a base terminal of each unijunction transistor through the impedance associated with the transistor.

6. The pulse generator of claim 5 wherein opposite ends of each impedance are connected directly to the gate electrode and cathode of an associated one of said thyristors through a pair of conductors.

7. The pulse generator of claim 1 including a rectifier means connected to said secondary winding means for supplying power to said firing circuits and said single capacitor.

8. The pulse generator of claim 7 wherein said secondary winding means comprises three separate windings connected in a Y-configuration, one end of each of said windings being connected to an associated firing circuit and to said rectifier means.

9. In a rectifier system, including a plurality of controlled rectifiers, for rectifying multiphase AC, said system having an input circuit for receiving power from a multi-phase AC source, a firing control system for sequentially firing said controlled rectifiers a predetermined number of degrees apart, said firing control system comprising A. a capacitor,
B. a plurality of series circuits each including a switch device and an impedance, each series circuit being connected across said capacitor for discharging the capacitor in response to the closure of any one of the switch devices,
C. a like plurality of firing circuits one for each of said controlled rectifiers, each of said firing circuits having means including said capacitor and a different one of said series circuits for forming a firing pulse by discharge of the capacitor and delivering the pulse to the associated one of said controlled rectifiers when that switch device is closed,
D. means for closing said series circuits in sequence comprising transformer means having primary winding means coupled to said input circuit and secondary winding means for developing a plurality of reference AC waveforms one for each of said firing circuits, said waveforms differing in phase from each other by said predetermined number of degrees, means for applying each of said reference waveforms to a different one of said firing circuits, means in each of said firing circuits for generating a timing waveform in response to the reference waveform applied thereto, said timing waveforms of the respective firing circuits differing in phase from each other by said predetermined number of degrees, means in each firing circuit and responsive to its timing waveform for closing its associated series circuit, and
E. means for simultaneously phase-shifting said timing waveforms relative to said reference waveforms comprising individual phase shifting means in each of said firing circuits, and common control means connected to all said individual phase shifting means for the common control thereof.

10. The combination as in claim 9 wherein each of said switch devices comprises a unijunction transistor, each of said controlled rectifiers comprises a thyristor, each of said impedances being connected in series with a different one of said unijunction transistors, opposite ends of each impedance are respectively connected to the gate electrode and cathode of an associated one of said thyristors, and said capacitor is connected across the emitter and a base terminal of each unijunction transistor through the impedance associated with the transistor.

11. The combination as in claim 9 including rectifier means connected to said secondary winding means for supplying power to said firing circuits and said capacitor.

12. The combination as in claim 9 wherein: multiphase is three-phase; each mentioned plurality corresponds to the quantity three; and said predetermined number of degrees is 120°.

13. The combination as in claim 12 wherein said transformer means comprises three single-phase transformers having their primary windings connected in a delta configuration and their secondary windings connected in a Y-configuration.

14. The combination as in claim 12 including rectifier means connected to said secondary winding means for supplying power to said firing circuits and said capacitor.

15. The combination as in claim 12 wherein said secondary winding means comprises three secondary windings connected in Y-configuration, one end of each of said secondary windings being connected to a different one of said firing circuits.

16. The combination as in claim 15 including rectifier means connected to said secondary winding means for supplying power to said firing circuits and said capacitor.

* * * * *